(12) United States Patent
Serobian (10) Patent No.: US 9,399,722 B2
(45) Date of Patent: Jul. 26, 2016

(54) COMPOSITIONS AND METHODS FOR TREATING AUTOMOTIVE SURFACES

(75) Inventor: Ashot K. Serobian, Martinez, CA (US)

(73) Assignee: THE ARMOR ALL/STP PRODUCTS COMPANY, Danbury, CT (US)

( * ) Notice: Subject to any disclaimer, the term of this patent is extended or adjusted under 35 U.S.C. 154(b) by 352 days.

(21) Appl. No.: 13/076,847

(22) Filed: Mar. 31, 2011

(65) Prior Publication Data

US 2012/0252923 A1    Oct. 4, 2012

(51) Int. Cl.
| | |
|---|---|
| C08L 83/04 | (2006.01) |
| C09D 183/04 | (2006.01) |
| C09D 5/16 | (2006.01) |
| B05D 5/08 | (2006.01) |
| C08L 33/10 | (2006.01) |
| C08G 77/00 | (2006.01) |

(52) U.S. Cl.
CPC .............. *C09D 183/04* (2013.01); *C08L 83/04* (2013.01); *C09D 5/1637* (2013.01); *B05D 5/08* (2013.01); *C08G 77/70* (2013.01); *C08L 33/10* (2013.01)

(58) Field of Classification Search
CPC ................................ C11D 3/373; C08L 83/04
USPC ........................................................ 523/102
See application file for complete search history.

(56) References Cited

U.S. PATENT DOCUMENTS

| | | | |
|---|---|---|---|
| 3,814,710 A | 6/1974 | Duncan | 260/28 |
| 4,398,953 A | 8/1983 | Van der Linde | 106/10 |
| 4,680,617 A * | 7/1987 | Ross | 257/795 |
| 4,882,377 A | 11/1989 | Sweet et al. | |
| 5,013,808 A | 5/1991 | Piskoti | 528/23 |
| 5,330,747 A | 7/1994 | Krzysik | 424/63 |
| 5,962,074 A | 10/1999 | Wollner | 427/322 |
| 6,013,323 A | 1/2000 | Klayder et al. | 427/384 |
| 6,506,715 B1 | 1/2003 | Schultz et al. | 510/189 |
| 6,953,500 B2 | 10/2005 | Lewis | 106/3 |
| 7,067,573 B1 | 6/2006 | Serobian | 524/269 |
| 7,223,384 B1 | 5/2007 | Decoster et al. | |
| 7,318,871 B2 | 1/2008 | Egan et al. | 134/42 |
| 7,378,382 B2 | 5/2008 | Serobian et al. | 510/466 |
| 7,399,738 B1 | 7/2008 | Serobian | 510/241 |
| 7,503,963 B2 | 3/2009 | Jordan et al. | 106/3 |
| 7,503,964 B2 * | 3/2009 | Hasinovic | 106/10 |
| 7,541,323 B2 | 6/2009 | Serobian | 510/241 |
| 7,584,519 B2 | 9/2009 | Ouellette et al. | 15/227 |
| 7,645,333 B2 | 1/2010 | Serobian | 106/287.1 |
| 7,699,941 B2 | 4/2010 | Pivonka et al. | 134/42 |
| 7,744,952 B2 | 6/2010 | Huang et al. | 427/180 |
| 7,744,953 B2 | 6/2010 | Huang et al. | 427/180 |
| 7,753,998 B2 | 7/2010 | Schultz et al. | 106/3 |
| 7,781,502 B2 | 8/2010 | Cheng et al. | 524/56 |
| 2005/0176599 A1 | 8/2005 | Bergquist et al. | 510/101 |
| 2006/0067906 A1 | 3/2006 | Sanders | |
| 2007/0128962 A1 * | 6/2007 | Serobian | 442/249 |
| 2007/0275867 A1 | 11/2007 | Serobian | 510/466 |
| 2007/0277697 A1 | 12/2007 | Diamond et al. | 106/3 |
| 2009/0025508 A1 | 1/2009 | Liao et al. | 75/234 |
| 2009/0035451 A1 * | 2/2009 | Serobian | 427/11 |

OTHER PUBLICATIONS

International Search Report and Written Opinion dated Jun. 29, 2012 from PCT/US2012/030691.
International Preliminary Report on Patentability (IPRP) dated Apr. 8, 2013 from corresponding PCT/US2012/030691, pp. 24.
Canadian Patent Office action dated Apr. 17, 2015 from corresponding Canadian Patent Application No. 2,807,824, pp. 4.
Office Action dated Sep. 2, 2015 from corresponding German Patent Application No. 11 2012 001 495.2 pp. 8.

\* cited by examiner

*Primary Examiner* — Michael Pepitone
(74) *Attorney, Agent, or Firm* — Ohlandt, Greeley, Ruggiero & Perle, L.L.P.

(57) ABSTRACT

This disclosure relates to compositions containing a) a silicone resin, b) a first silicone fluid having a viscosity from about 1 to about 15,000 centistokes at 25° C.; c) a second silicone fluid having a viscosity from about 1 to about 30,000 centistokes at 25° C.; d) an acrylic polymer; e) a hydrocarbon solvent; and f) water. The compositions of this disclosure provide long lasting hydrophobic coatings with high water contact angles for automotive surfaces, in which the hydrophobic automotive surfaces possess self-cleaning functions, e.g., water and dirt repellency. This disclosure also relates to methods for treating automotive surfaces and to automotive surfaces coated with the compositions.

23 Claims, 2 Drawing Sheets

COMPOSITIONS AND METHODS FOR TREATING AUTOMOTIVE SURFACES

BACKGROUND

1. Field of the Disclosure

This disclosure relates to compositions that provide long lasting hydrophobic coatings with high water contact angles for automotive surfaces, in which the hydrophobic automotive surfaces possess self-cleaning functions, e.g., water and dirt repellency. This disclosure also relates to methods for treating automotive surfaces and to automotive surfaces coated with the compositions.

2. Discussion of the Background Art

Car owners have a long-standing desired to provide their automobiles with a beautiful, shiny appearance, and to protect the underlying paint from environmental damage such as mud, water spots, and the effects of the sun. Over the years, car owners have come to prefer waxes to protect and beautify the exterior painted surfaces of their vehicles because wax finishes are typically more durable than finishes provided by wax-free products, e.g., greases or oils.

The wettability of exterior automotive surfaces is an important property for car owners. Wettability is governed by both the chemical composition and geometrical microstructure of the automotive surface. For car owners, a hydrophobic surface that affords water beading is highly desired.

A characteristic of a hydrophobic surface is that water forms spherical droplets immediately when dropping on the surface. This is referred to as water beading. Such a hydrophobic surface possesses a self-cleaning function. For example, droplets formed on an automotive surface carry dust away after rolling off the automotive surface. This hydrophobic phenomenon is caused by the low surface tension of the surface.

When a liquid drops on a surface of an object, an angle is then formed between the surface and the tangent line of the drop, called contact angle $\theta$. When the tension in the gas-solid interface (also called solid surface energy) is high, the contact angle tends to be low, which means the surface easily gets wet. A contact angle of 0 degrees indicates that water spreads over and becomes a film on the surface so that the surface would completely get wet. On the contrary, if the tension in the gas-solid interface is low, the contact angle tends to be high, indicating that the surface does not easily get wet. Therefore, a contact angle of 180 degrees means that the liquid forms spherical droplets and cannot wet the surface at all.

Currently, hydrophobic automotive surfaces with high water contact angles are arousing interest because these hydrophobic surfaces can be self-cleaning based on their water and dirt repellency. These self-cleaning automotive surfaces offer a high potential for consumers to save on cleaning and other maintenance costs, and also are good for the ecobalance, since cleaning chemicals no longer pollute the environment and since energy is saved by reducing or eliminating maintenance cycles.

There is a need to develop hydrophobic coatings with high water contact angles for automotive surfaces, in which the hydrophobic automotive surfaces possess self-cleaning functions, e.g., water and dirt repellency.

The present disclosure provides many advantages, which shall become apparent as described below.

SUMMARY

This disclosure relates in part to a composition comprising:
a) a silicone resin;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) a hydrocarbon solvent; and
f) water.

This disclosure also relates in part to a method of treating an automotive surface. The method comprises:
a) applying an effective amount of an aqueous composition to said automotive surface; and
b) distributing said aqueous composition onto said automotive surface with an application implement.
The aqueous composition comprises:
a) a silicone resin;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) a hydrocarbon solvent;
f) water; and
g) a propellant.

This disclosure further relates in part to an automotive surface coated with a composition. The composition comprises:
a) a silicone resin;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) a hydrocarbon solvent; and
f) water.

This disclosure yet further relates in part to a composition comprising:
a) a silicone resin;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer; and
e) water.

This disclosure also relates in part to a composition comprising:
a) a silicone resin;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) a wax; and
f) water.

This disclosure further relates in part to a composition comprising:
a) a silicone resin;
b) an acrylic polymer;
c) a hydrocarbon solvent; and
d) water.

With the composition of this disclosure, one can simply wipe and shine onto a surface. No haze will form because the advanced polymer composition of this disclosure bonds to the surface and forms a clear, high gloss, long-lasting, protective layer. The composition of this disclosure can be applied in full sun or shade, in any temperature and in all seasons. This composition is formulated for all paint surfaces.

Further objects, features and advantages of the present disclosure will be understood by reference to the following drawings and detailed description.

DETAILED DESCRIPTION OF THE PREFERRED EMBODIMENT

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, effective amounts are generally those amounts listed as the ranges or levels of ingredients in the descriptions. Unless otherwise stated, amounts listed in percentage ("%") are in weight percent (based on 100% active) of the total composition.

The term "viscosity", as used herein is the viscosity of a liquid component of the disclosure as quoted as a kinematic viscosity in centistokes (cSt), measured at 25° C. (77° F.), unless otherwise specified.

For purposes of this disclosure, exterior surfaces of automobiles and other vehicles is meant to be interpreted broadly and includes an automobile or other vehicle body, trim, wheels, wheelovers, and tires. Vehicles other than automobiles include, e.g., motorcycles, bicycles and trucks. In addition, the surface to be treated in accordance with the present disclosure can be that of a stationary article having a shiny painted surface. The surface to be treated may be clean, dirty, new or moderately oxidized and may be cool or hot.

The present disclosure provides compositions that protect and preserve surfaces, enhance shine or gloss of surfaces, and clean surfaces.

The compositions of this disclosure provide long lasting hydrophobic coatings with high water contact angles for automotive surfaces. The compositions of this disclosure exhibit a water contact angle of above 100°, preferably above 105°, when directly coated on an automotive surface. The hydrophobic automotive surfaces possess self-cleaning functions, e.g., water and dirt repellency.

Silicone Resins

Silicone resins included in the compositions of the present disclosure can be highly cross-linked polymeric Si-based systems. The crosslinking can be introduced through the incorporation of trifunctional and tetrafunctional silanes with monofunctional or difunctional, or both, silanes during manufacture of the silicone resin. As is apparent to one of ordinary skill in the art, the degree of crosslinking that is required in order to result in a silicone resin will vary according to the specific silane units incorporated into the silicone resin. Generally, silicone materials which have a sufficient level of trifunctional and tetrafunctional siloxane monomer units (and hence, a sufficient level of crosslinking) such that they dry down to a rigid, or hard, film are considered to be silicone resins. The ratio of oxygen atoms to silicon atoms is indicative of the level of crosslinking in a particular silicone material. Silicone resins suitable for use in the compositions of the present disclosure generally have at least about 1.1 oxygen atoms per silicon atom. Preferably, the ratio of oxygen to silicon atoms is at least about 1.2:1.0. Silanes used in the manufacture of silicone resins include, but are not limited to: monomethyl-, dimethyl-, trimethyl-, monophenyl-, diphenyl-, methylphenyl-, monovinyl-, and methylvinyl-chlorosilanes, and tetra-chlorosilane, with the methyl-substituted silanes being most commonly utilized.

Silicone materials and silicone resins in particular, can conveniently be identified according to a nomenclature system known to those of ordinary skill in the art as "MDTQ" nomenclature. Under this system, the silicone is described according to presence of various siloxane monomer units which make up the silicone. Briefly, the symbol M denotes the monofunctional unit $(CH_3)_3SiO_{0.5}$; D denotes the difunctional unit $(CH_3)_2SiO$; T denotes the trifunctional unit $(CH_3)SiO_{1.5}$; and Q denotes the quadra- or tetra-functional unit $SiO_2$. Primes of the unit symbols (e.g. M', D', T', and Q') denote substituents other than methyl, and must be specifically defined for each occurrence. Typical alternate substituents include, but are not limited to, groups such as vinyl, phenyls, amines, hydroxyls, and the like. The molar ratios of the various units, either in terms of subscripts to the symbols indicating the total number of each type of unit in the silicone (or an average thereof) or as specifically indicated ratios in combination with molecular weight complete the description of the silicone material under the MDTQ system. Higher relative molar amounts of T, Q, T' and/or Q' to D, D', M and/or M' in a silicone resin indicates higher levels of cross-linking. As discussed above, however, the overall level of cross-linking can also be indicated by the oxygen to silicon ratio.

Preferred silicone resins for use in the compositions of the present disclosure include, but are not limited to MQ, MT, MTQ, MDT and MDTQ resins. Methyl is a preferred silicone substituent. Especially preferred silicone resins are MQ resins, wherein the M:Q ratio is from about 0.5:1.0 to about 1.5:1.0 and the average molecular weight of the silicone resin is from about 1000 to about 10,000.

The silicone resin is preferably a MQ resin. In one embodiment of the present disclosure, there can be at least two different foreseeable silicone resins. In another embodiment, one resin can be an MQ resin and another resin a different MQ resin.

MQ resins are generically known in the art and contain M units, represented by the formula $R^1_3SiO_{1/2}$ and Q units, represented by the formula $SiO_{4/2}$. It is recognized that while the MQ resins are primarily made from M and Q units, there can be up to 5 mole percent of D units represented by the formula $R^2_2SiO_{2/2}$ and T units, represent by the formula $R^3SiO_{3/2}$, wherein each $R^1$, $R^2$ and $R^3$ is independently a monovalent hydrocarbon radical. Non-limiting examples of preferred monovalent hydrocarbon radical include those monovalent hydrocarbon radicals having from about 1 to about 6 carbon atoms, such as alkyl radicals including methyl, ethyl, and isopropyl; alkenyl radicals including ethylene, propenyl, and hexenyl; cycloaliphatic radicals such as cyclopentyl cyclohexenyl; olefinic-containing radicals such as vinyl and allyl; and olefinic-containing radicals. Preferably, the monovalent hydrocarbon radical is methyl.

Preferably, the MQ resin has an M:Q ratio of about 0.5 and an n value of about 1.5. Most preferably, the MQ resin is trimethylsiloxysilicate. Non-limiting examples of acceptable commercially available MQ resins can be obtained from Wacker Silicones Corporation of Adrian, Mich. (e.g., Wacker 803 and 804), Dow Corning (MQ 1600, MQ 16035 and MQ 1603H) and the General Electric Company (e.g., G. E. 1170-002 and SR 1000). A preferred silicone resin for use in the compositions of this disclosure is Belsil TMS 803 (Wacker).

The composition of this disclosure preferably includes from about 0.1% to about 15.0% by weight, more preferably from about 0.1% to about 12.0% by weight, and most preferably about 0.1% to about 10.0% by weight, of the silicone resin.

Silicone Fluids

The compositions of this disclosure contain at least two polyorganosiloxane fluids. These polyorganosiloxane fluids are also commonly polydiorganosiloxanes and are referred to as "silicone oils" or "silicones" and are distinguished from silicone elastomers and resins, which are more thoroughly cross-linked than silicone oils.

The polyorganosiloxane fluids used in the present disclosure are preferably polydiorganosiloxane fluids selected from the group consisting of silicone oils having the general formula:

$(R_nSiO_{((4-n)/2)})m$ wherein n is between 0 and 3, m is 2 or greater, and R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof. Additional suitable polydiorganosiloxanes are defined in Silicone Compounds Register and Review, 5th Edition, R. Anderson, G. L. Larson and C. Smith Eds., Huls America Inc., Piscataway, N.J., p. 247 (1991), the disclosure of which is incorporated herein by reference.

These example silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkyl-siloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethyl-polysiloxane, diethylpolysiloxane, high molecular weight dimethicone, mixed C1-C30 alkyl polysiloxane, phenyl dimethicone, dimethiconol, and mixtures thereof. Non-limiting examples of silicones useful herein are also described in U.S. Pat. No. 5,011,681, the disclosure of which is incorporated herein by reference. The silicone compounds useful herein also include polyalkyl or polyaryl siloxanes. The alkyl or aryl groups substituted on the siloxane chain (R) or at the ends of the siloxane chains can have any structure as long as the resulting silicone remains fluid at or around room temperature. Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof.

Suitable silicone compounds are polydimethylsiloxane, polydiethylsiloxane, polymethylphenylsiloxane, polyalkylarylsiloxane, polyethyleneoxydialkylsiloxane, polypropyleneoxydialkylsiloxane, polydialkylcyclosiloxane, and mixtures thereof. Polydimethylsiloxane, which is also known as dimethicone, is suitable and readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200 series.

Other suitable polydiorganosiloxanes include polyalkylaryl siloxane fluids containing one or more alkyl or alkylaryl substituents can also be used, for example, and include, but are not limited to polymethylphenylsiloxanes, poly[(dimethylsiloxane)/methylvinyl-siloxane)], poly[(dimethylsiloxane)/(diphenylsiloxane)], poly[(dimethylsiloxane)/-(phenylmethylsiloxane)], poly[(dimethylsiloxane)/(diphenylsiloxane)/-(methyl-vinylsiloxane)], and mixtures thereof. These siloxanes are available, for example, from the General Electric Company as SF 1075 methyl phenyl fluid or from Dow Corning as 556 Cosmetic Grade Fluid, Rhodorsil 763 from Rhone-Poulenc, Silbione 70641 V 30 and 70641 V 200 from Rhone-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023.

Higher molecular weight silicones, including silicone gums and resins, may be used in accordance with the present disclosure and include polydiorganosiloxanes with a molecular mass of between 200,000 and 5,000,000, used alone or as a mixture in a solvent chosen from volatile silicones, polydimethylsiloxane (PDMS) oils, polyphenylmethylsiloxane (PPMS) oils, isoparaffins, methylene chloride, pentane, dodecane, tridecane and tetradecane, or mixtures thereof. The silicones can be linear or branched, and can be modified by chemical groups to provide additional properties. See, for example U.S. Patent Application Publication No. 2007/0275867, the disclosure of which is incorporated herein by reference.

Organo-modified silicones useful in the present disclosure are silicones as defined above, containing in their general structure one or more organofunctional groups directly attached to the siloxane chain or attached via a hydrocarbon-based radical. Examples include silicones containing: a) polyethyleneoxy and/or polypropyleneoxy groups; b) (per)fluoro groups, for instance trifluoroalkyl groups; c) hydroxyacylamino groups; d) thiol groups; e) carboxylate groups; f) hydroxylated groups; g) alkoxylated groups containing at least 12 carbon atoms; h) acyloxyalkyl groups containing at least 12 carbon atoms; i) quaternary ammonium groups; j) amphoteric or betaine groups; and k) bisulphite groups. See, for example U.S. Patent Application Publication No. 2007/0275867, supra.

Also suitable are the use of one or more volatile silicones, that is silicone oils with sufficient vapor pressure or volatility sufficient to at least partially or completely evaporate into the atmosphere during and/or after application of the inventive compositions onto a surface. The inventive compositions may contain one or more volatile silicone fluids in combination with one or more non-volatile silicone fluids. The more volatile silicones are believed to promote leveling of the residual silicone polish film, thus deepening the color of painted surfaces, and to aid in controlling the flowability and/or spreadability of the composition, particularly in embodiments of the disclosure employing less volatile or non-volatile silicone oils that are desired to be deposited onto the treated surface. Volatile silicone fluids generally are low viscosity silicone fluids with an appreciable vapor pressure at ambient temperatures. Generally, the volatile silicone fluids useful in the present disclosure have a viscosity of less than about 10 centistokes at 25° C., and optionally less than about 5 centistokes at 25° C.

Suitable volatile silicone fluids include the polydimethylcyclosiloxanes. Polydimethylcyclosiloxane fluids useful in the present disclosure are disclosed, for example, in U.S. Patent Application Publication No. 2007/0275867, supra.

The polyorganosiloxanes in the composition are believed to provide a water and water vapor resistant coating upon the surface of the treated materials to enhance their resistant to environmental stresses, such as water permeation, oxygen permeation and assault by other environmental contaminants.

The organopolysiloxanes are also useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the organopolysiloxanes are useful for their restorative effect when used on aged and worn surfaces.

The polyorganosiloxanes in the composition are also believed to provide a soil, oil, dirt and grime resistant coating upon the surface of the treated materials to enhance their resistant to staining and soiling, water and microbial growth. In one embodiment of the present disclosure, the polyorganosiloxane includes one or more of a silicone selected from polydimethylsiloxane, polydiethylsiloxane, polymethylphenylsiloxane, polyalkylarylsiloxane, polyethyleneoxydialkylsiloxane, polypropyleneoxydialkylsiloxane and polydialkylcyclosiloxane.

In suitable embodiments, the first polyorganosiloxane fluid comprises about 0.01% by weight to about 12% by weight, or about 0.05% by weight to about 10% by weight, or alternatively about 0.1% by weight to about 8% by weight of the inventive composition. The second polyorganosiloxane fluid comprises about 0.01% by weight to about 12% by weight, or about 0.05% by weight to about 10% by weight, or alternatively about 0.1% by weight to about 8% by weight of the inventive composition. The total concentration of polyorganosiloxane fluids in the compositions of this disclosure can range from about 0.01% by weight to about 24% by weight, or about 0.05% by weight to about 20% by weight, or alternatively about 0.1% by weight to about 16% by weight of the inventive composition.

The first polyorganosiloxane fluid has a viscosity from about 1 to about 15,000 centistokes at 25° C., preferably a viscosity from about 1 to about 7,500 centistokes at 25° C., and more preferably a viscosity from about 1 to about 1000 centistokes at 25° C. The second polyorganosiloxane fluid has a viscosity from about 1 to about 30,000 centistokes at 25° C., preferably a viscosity from about 1 to about 20,000 centistokes at 25° C., and more preferably a viscosity from about 1 to about 15,000 centistokes at 25° C. The viscosity of the first and second silicone fluids can be the same or different from each other.

Blends of the first polyorganosiloxane fluid, the second polyorganosiloxane fluid, and the silicone resin can be useful in formulating the compositions of this disclosure. See, for example, U.S. Pat. No. 7,399,738, the disclosure of which is incorporated herein by reference.

Acrylic-Based Polymer

Polymers with a thickening effect which modify the rheology of the composition are also used with advantage in the compositions of this disclosure. Such polymers may also be used to increase the surface substantivity of the composition and increase the hydrophobicty of the treated surface. These polymers may be, are preferably, hydrophobically modified acrylate-based polymers, some of which may have relatively high molecular weights of greater than 1,000,000 g/mol.

Suitable products are, for example, the products marketed by Rohm & Haas under the name of Acusol®, which are predominantly polyacrylates with different degrees of alkylation or crosslinking or hydrophobicized nonionic polyols, or the products marketed by B.F. Goodrich under the name of Carbopol®, which are polyacrylates or copolymers of acrylic acid and alkylated (preferably C5-C10-alkylated) acrylic acids, or the products marketed by B.F. Goodrich under the name of Pemulen®, which are high molecular weight acrylic acid copolymers of the acrylate/C10-C30 alkyl acrylate crosspolymer type. A more detailed description of the types of hydrophobically modified polycarboxylic acids which may be used in this disclosure, including the process for making the same, may be found in U.S. Pat. No. 5,232,622, the disclosure of which is incorporated herein by reference. A preferred product for use in the compositions of this disclosure is an acrylate/acrylamide copolymer available from Lubrizol as Novemer™ EC-1 Polymer.

In one embodiment, the acrylic based polymer is a polyacrylate powder which has been crosslinked with a polyalkenyl polyether or is an acrylic polymer containing acid groups and which dissolves and swells immediately when neutralized with an alkali salt. An example of a hydrophobically modified cross-linked polyacrylate powder which can be used in the present disclosure is commercially available from Lubrizol Advanced Materials, Inc. (formerly Noveon, Inc.) (Cleveland, Ohio) under the designation Carbopol® EZ-3. Carbopol® EZ-3 is a hydrophobically modified, crosslinked polyacrylate powder having a pH in water of 2.5-3.5 and which has been crosslinked with a polyalkenyl polyether.

An example of another preferred acrylic-based polymer for use in this disclosure is commercially available from Rohm and Haas (Philadelphia, Pa.) under the designation Acusol™ 820. The Acusol™ 820 product is a water emulsion of acrylic polymer containing acid groups, wherein the acrylic polymer will dissolve and swell neutralized with an alkali salt. The emulsion is milky-white and has a density of 8.75 lb/gal, a pH of about 2.7-3.0, and a non-volatile solids content of about 30% by weight.

The inventive compositions require the use of at least one acrylic polymer that provides rheological structure to the aqueous system in combination with the dispersed polyorganosiloxanes. Polymers suitable for use are selected from the group of polymers that provide aqueous dispersions of the silicone oils in aqueous compositions exhibiting the desired rheological parameters which allow the composition to adhere to the treated surface. The ability of the composition to adhere to the treated surface is critical to preventing dripping. In addition, the composition may be applied without touching the surface by allowing the composition to be sprayed on a surface without the need to spread or wipe the treated surface. To help define the key rheological parameters of the composition, the terms Critical Strain and Elastic Modulus, are used and described herein.

The primary function of the polymers is their utility in stabilizing fine dispersions, that is to say fine droplets, of the silicone oils in the aqueous phase, providing compositions with good handling, storage and dispensing characteristics that exhibit the characteristic rheological parameters described herein. Without being bound by theory, it is believed that polymers employed in the disclosure provide for extended polymer networks within the aqueous phase having properties, defined through the rheological parameters of Critical Strain and Elastic Modulus, that effectively stabilize a plurality of fine droplets of the hydrophobic phase through a physical mechanism without the requirement of emulsification, that is to say, without the requirement of surface active emulsifier compounds that are commonly employed in the art to modify the surface and/or interfacial properties of the hydrophobic phase for compatibility within the aqueous phase or water continuum.

Hence, the acrylic polymers that are able to form extended networks in an aqueous environment are suitably employed in the inventive compositions and are selected from the class of polymers that exhibit the desired rheological parameters that have been discovered here to effectively represent a rheological domain, defined by the Critical Strain and Elastic Modulus as described herein, where the silicone oils can be formulated as fine dispersions without the use of conventional emulsifiers.

Also suitable are polymers that provide a dual benefit to the inventive compositions in that they provide for compositions exhibiting the desired rheological Critical Strain value and Elastic Modulus value parameters, and also providing an additional or secondary benefit. An exemplary secondary benefit is surface modification of the surfaces treated with the inventive compositions, whereby the surface is modified to exhibit a property such as enhanced hydrophobicity, anti-soiling, water and/or stain repellency, reduced friction, increased lubricity, softness, anti-static and/or charge dissipative properties, reduced dust and/or lint retention, and the combinations of these properties and/or benefits.

The compositions may exhibit a rheological Critical Strain value greater than zero and less than about 0.5 and an Elastic Modulus value greater than zero and less than about 400 Pascals.

In suitable embodiments, the polymer comprises from about 0.001% by weight to about 5% by weight, or from about 0.01% by weight to about 4% by weight, or alternatively from about 0.05% by weight to about 3% by weight of the inventive composition. In one embodiment, the polymer is selected from the group consisting of polyacrylate polymers and copolymers containing at least one acrylate monomer, alkali swellable polyacrylate polymers and copolymers containing at least one acrylate monomer, non-linear polyacrylate polymers cross-linked with at least one polyalkenyl polyether monomer, hydrophobically modified cross-linked polyacrylate polymers and copolymers containing at least one hydrophobic monomer, and mixtures thereof. In one embodiment, the polymer is an alkali-swellable acrylic polymer or copolymer cross-linked with at least one polyalkenyl polyether monomer.

Solvent

A solvent is included in the compositions of the present disclosure to assist in removing dirt, grease, and other unwanted impurities from the surface to be treated. The particular solvent employed in the inventive composition may be selected depending on the particular end use application, and particularly on the type of surface to be treated. In addition, the solvent may serve to help solubilize non-water soluble or poorly water soluble adjuvants, such as ultraviolet light (UV) absorbers, fragrances, perfumes and the like, for the purpose of preventing separation of these ingredients in the inventive compositions. Suitable solvents include both hydrophilic and hydrophobic compounds, generally comprising solvents that are water soluble, water-miscible as well as water insoluble and water-immiscible compounds. Mixtures of any solvent may optionally be employed in the inventive compositions. A preferred solvent for use in the compositions of this disclosure is a paraffinic naphthenic solvent available from Sasol as LPA-200.

Suitable organic solvents include, but are not limited to, monohydric alcohols and polyhydric alcohols, such as for example $C_{1-6}$ alkanols and $C_{1-6}$ diols, alkylene glycols, such as for example $C_{1-10}$ alkyl ethers of alkylene glycols, glycol ethers, such as for example $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to the monohydric alcohols including for example methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to; ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes. Water insoluble solvents such as isoparaffinic hydrocarbons, mineral spirits, alkylaromatics, terpenoids, terpenoid derivatives, terpenes, and terpenes derivatives can be mixed with a water soluble solvent when employed.

Examples of organic solvent having a vapor pressure less than 0.1 mm Hg (20° C.) include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all-available from ARCO Chemical Company).

The solvent is present at a level of from about 0.001% to about 25%, alternatively from about 0.01% to about 20%, or alternatively from about 1% to about 15% by weight.

Water

Since the composition is an aqueous composition, water can be, along with a solvent, a predominant ingredient. The water may be deionized, industrial soft water, or any suitable grade of water. Preferably, the water used in the aqueous dispersion is deionized or distilled water.

The water should be present at a level of greater than 60% by weight, more preferably from about 65% to about 98% by weight, and most preferably, from about 70% to about 95% by weight. Where the inventive composition is concentrated, the water may be present in the composition at a concentration of less than about 60% by weight.

Preservative

Preservatives, when used, include, but are not limited to, mildewstat or bacteriostat, methyl, ethyl and propyl parabens, short chain organic acids (e.g., acetic, lactic and/or glycolic acids), bisguanidine compounds (e.g., Dantogard and/or Glydant) and/or short chain alcohols (e.g., ethanol and/or isopropyl alcohol). An example of a suitable preservative which can be used in the compositions of the present disclosure is Dantoguard Plus™ (dimethylol-5,5-dimethylhydantoin), commercially available from Lonza (Fairfield, N.J.).

The mildewstat or bacteriostat includes, but is not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories.

In suitable embodiments, the preservative comprises from about 0.0001% by weight to about 1% by weight, or from about 0.001% by weight to about 0.5% by weight, or alternatively from about 0.01% by weight to about 0.5% by weight of the inventive composition.

Fragrance

The As used herein the term "fragrance oil" relates to the mixture of perfume raw materials that are used to impart an overall pleasant odor profile to the composition of this disclosure. As used herein the term "perfume raw material" relates to any chemical compound which is odiferous when in an un-entrapped state, for example in the case of pro-perfumes, the perfume component is considered, for the purposes of this disclosure, to be a perfume raw material, and the pro-chemistry anchor is considered to be the entrapment material. In addition, "perfume raw materials" are defined by materials with a ClogP value preferably greater than about 0.1, more preferably greater than about 0.5, even more preferably greater than about 1.0. As used herein, the term "ClogP" means the logarithm to base 10 of the octanol/water partition coefficient. This can be readily calculated from a program called "CLOGP" which is available from Daylight Chemical Information Systems Inc., Irvine, Calif., U.S.A. Octanol/water partition coefficients are described in more detail in U.S. Pat. No. 5,578,563, which is hereby incorporated by reference.

The individual perfume raw materials which comprise a known natural oil can be found by reference to Journals commonly used by those skilled in the art such as "Perfume and Flavourist" or "Journal of Essential Oil Research". In addition, some perfume raw materials are supplied by the fragrance houses as mixtures in the form of proprietary specialty accords. In order that fragrance oils can be developed with the appropriate character for the present disclosure, the perfume raw materials have been classified based upon two key physical characteristics:

(i) boiling point (BP) measured at 1 atmosphere pressure. The boiling point of many fragrance materials are given in Perfume and Flavor Chemicals (Aroma Chemicals), Steffen Arctander (1969). Perfume raw materials for use in the present disclosure are divided into volatile raw materials (which have a boiling point of less than, or equal to, about 250° C.) and residual raw materials (which have a boiling point of greater than about 250° C., preferably greater than about 275° C.). All perfume raw materials will preferably have boiling points (BP) of about 500° C. or lower.

(ii) odor detection threshold which is defined as the lowest vapor concentration of that material which can be olfactorily detected. The odor detection threshold and some odor detection threshold values are discussed, for example, in "Standardized Human Olfactory Thresholds", M. Devos et al., IRL Press at Oxford University Press, 1990, and "Compilation of Odor and Taste Threshold Values Data", F. A. Fazzalar, editor ASTM Data Series DS 48A, American Society for Testing and Materials, 1978, both of said publications being incorporated by reference. Perfume raw materials for use in the present disclosure can be classified as those with a low odor detection threshold of less than 50 parts per billion, preferably less than 10 parts per billion and those with a high odor detection threshold which are detectable at greater than 50 parts per billion (values as determined from the references above).

Since, in general, perfume raw materials refer to a single individual compound, their physical properties (such as ClogP, boiling point, odor detection threshold) can be found by referencing the citations above. In the case that the perfume raw material is a natural oil, which comprises a mixture of several compounds, the physical properties of the complete oil should be taken as the weighted average of the individual components. In the case that the perfume raw material is a proprietary specialty accord, the physical properties should be obtained from the supplier.

In general a broad range of suitable perfume raw materials can be found in U.S. Pat. Nos. 4,145,184, 4,209,417, 4,515,705, 4,152,272, and 7,378,382, the disclosures of which are incorporated herein by reference. Non-limiting examples of perfume raw materials which are useful for blending to formulate fragrance oils for the present disclosure are given below. Any perfume raw materials, natural oils or proprietary specialty accords known to a person skilled in the art can be used within the present disclosure.

Volatile perfume raw materials useful in the present disclosure are selected from, but are not limited to, aldehydes with a relative molecular mass of less than or equal to about 200, esters with a relative molecular mass of less than or equal to about 225, terpenes with a relative molecular mass of less than or equal to about 200, alcohols with a relative molecular mass of less than or equal to about 200 ketones with a relative molecular mass of less than or equal to about 200, nitriles, pyrazines, and mixtures thereof.

Examples of volatile perfume raw materials having a boiling point of less than or equal to 250° C., with a low odor detection are selected from, but are not limited to, anethol, methyl heptane carbonate, ethyl aceto acetate, para cymene, nerol, decyl aldehyde, para cresol, methyl phenyl carbinyl acetate, ionone alpha, ionone beta, undecylenic aldehyde, undecyl aldehyde, 2,6-nonadienal, nonyl aldehyde, octyl aldehyde. Further examples of volatile perfume raw materials having a boiling point of less than, or equal to, 250° C., which are generally known to have a low odor detection threshold include, but are not limited to, phenyl acetaldehyde, anisic aldehyde, benzyl acetone, ethyl-2-methyl butyrate, damascenone, damascone alpha, damascone beta, floracetate, frutene, fructone, herbavert, iso cyclo citral, methyl isobutenyl tetrahydro pyran, isopropyl quinoline, 2,6-nonadien-1-ol, 2-methoxy-3-(2-methylpropyl)-pyrazine, methyl octine carbonate, tridecene-2-nitrile, allyl amyl glycolate, cyclogalbanate, cyclal C, melonal, gamma nonalactone, c is 1,3-oxathiane-2-methyl-4-propyl.

Other volatile perfume raw materials having a boiling point of less than, or equal to, 250° C., which are useful in the present disclosure, which have a high odor detection threshold, are selected from, but are not limited to, benzaldehyde, benzyl acetate, camphor, carvone, borneol, bornyl acetate, decyl alcohol, eucalyptol, linalool, hexyl acetate, iso-amyl acetate, thymol, carvacrol, limonene, menthol, iso-amyl alcohol, phenyl ethyl alcohol, alpha pinene, alpha terpineol, citronellol, alpha thujone, benzyl alcohol, beta gamma hexenol, dimethyl benzyl carbinol, phenyl ethyl dimethyl carbinol, adoxal, allyl cyclohexane propionate, beta pinene, citral, citronellyl acetate, citronellal nitrile, dihydro myrcenol, geraniol, geranyl acetate, geranyl nitrile, hydroquinone dimethyl ether, hydroxycitronellal, linalyl acetate, phenyl acetaldehyde dimethyl acetal, phenyl propyl alcohol, prenyl acetate, triplal, tetrahydrolinalool, verdox, cis-3-hexenyl acetate.

Examples of residual "middle and base note" perfume raw materials having a boiling point of greater than 250° C., which have a low odor detection threshold are selected from, but are not limited to, ethyl methyl phenyl glycidate, ethyl vanillin, heliotropin, indol, methyl anthranilate, vanillin, amyl salicylate, coumarin. Further examples of residual perfume raw materials having a boiling point of greater than 250° C. which are generally known to have a low odor detection threshold include, but are not limited to, ambrox, bacdanol, benzyl salicylate, butyl anthranilate, cetalox, ebanol, cis-3-hexenyl salicylate, lilial, gamma undecalactone, gamma dodecalactone, gamma decalactone, calone, cymal, dihydro iso jasmonate, iso eugenol, lyral, methyl beta naphthyl ketone, beta naphthol methyl ether, para hydroxylphenyl butanone, 8-cyclohexadecen-1-one, oxocyclohexadecen-2-one/habanolide, florhydral, intreleven aldehyde.

Other residual "middle and base note" perfume raw materials having a boiling point of greater than 250° C. which are useful in the present disclosure, but which have a high odor detection threshold, are selected from, but are not limited to, eugenol, amyl cinnamic aldehyde, hexyl cinnamic aldehyde, hexyl salicylate, methyl dihydro jasmonate, sandalore, veloutone, undecavertol, exaltolide/cyclopentadecanolide, zingerone, methyl cedrylone, sandela, dimethyl benzyl carbinyl butyrate, dimethyl benzyl carbinyl isobutyrate, triethyl citrate, cashmeran, phenoxy ethyl isobutyrate, iso eugenol acetate, helional, iso E super, ionone gamma methyl, pentalide, galaxolide, phenoxy ethyl propionate.

A preferred fragrance oil for use in the compositions of this disclosure is Fragrance 373696 available from Symrise.

In suitable embodiments, the fragrance and/or perfume comprises 0.0001% by weight to about 10% by weight, or 0.001% by weight to about 5% by weight, or alternatively 0.01% by weight to about 1% by weight of the inventive composition.

Wax

In an embodiment, the inventive compositions contain a wax or their water-based emulsions. Waxes suitable for use in the compositions of this disclosure include vegetable waxes such as carnauba, candelilla, and ouricury; mineral waxes such as montan, paraffin, and microcrystalline waxes; animal waxes such as beeswax; and synthetic waxes such as amide waxes and silicone waxes. Combinations of two or more of the aforementioned waxes can also be used in the compositions of this disclosure.

In one embodiment, the wax for use in the compositions of this disclosure is carnauba wax water-based emulsion.

The wax can be present in the compositions of this disclosure at a level from about 0.5 to about 3.5% by weight, preferably from about 1.6 to about 3.0% by weight, and more preferably from about 1.8 to about 2.0% by weight of the inventive composition.

Adjuncts

The inventive compositions optionally contain one or more of the following adjuncts: lubricants, wetting agents, leveling agents, pH adjusters, buffers, spreading agents, brighteners, fluorescent whitening agents, ultraviolet (UV) absorbers, UV scatterers, infra-red (IR) absorbers, IR scatterers, free-radical quenchers, free-radical stabilizers, excited state quenchers (ESQ) and/or anti-oxidants, and their mixtures. Examples of UV effective agents suitable for use include, but are not limited to Tinuvin 123, Tinuvin 292, Tinuvin 384, Tinuvin 171 and Tinuvin 99, all available from the Ciba Chemical Company.

Other adjuncts include, but are not limited to, acids, electrolytes, dyes and/or colorants and/or pigments, solubilizing materials, stabilizers, thickeners, defoamers, hydrotropes, cloud point modifiers, preservatives, and other polymers and their mixtures. The solubilizing materials, when used, include, but are not limited to, hydrotropes (e.g. water soluble salts of low molecular weight organic acids such as the sodium and/or potassium salts of toluene, cumene, and xylene sulfonic acid). Defoamers, when used, include, but are not limited to, silicones, aminosilicones, silicone blends, and/or silicone/hydrocarbon blends.

These and other suitable additives which can be used in the composition of the present disclosure are disclosed, for example, in U.S. Pat. Nos. 7,378,382 and 7,399,738, the disclosures of which are incorporated herein by reference.

The adjuncts can be present at a level of from about 0.0001% to about 20%, alternatively from about 0.001% to about 10%, or alternatively from about 0.01% to about 5% by weight.

Propellant

It may be desirable to use the composition of the present disclosure in the form of an aerosol, particularly in a pressurized aerosol container employing a compressed gas or fluid to serve as a propellant system. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Examples include, but are not limited to those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane.

Other common volatile organic compounds, and their derivatives may suitably be employed, including dialkyl ethers, such as dimethyl ether and diethyl ether and the petroleum ethers. Volatile organic compounds may also be suitably employed as propellants, include the alkane series from methane, propane, butane, pentane and hexane and all of their respective isomers, and mixtures thereof, alone and in combinations thereof. Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochlorofluoro-carbons (HCFC). Some examples include but are not limited to HFC-125, HFC-134a, HFC-152a, HFC-227ea, HFC-245fa and HCFC-22.

Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa.

When an aerosol formulation is employed, one or more corrosion inhibitors known in the art are included in the formulations to protect metal portions of the pressurized system, including the can, valve, valve spring, nozzle and components of the aerosol package and dispenser assembly.

In suitable embodiments, the propellant comprises 1% by weight to about 90% by weight, or 2% by weight to about 80% by weight, or alternatively 5% by weight to about 70% by weight of the inventive composition.

Processing

The compositions of this disclosure can be made according to conventional methods known in the art. See, for example, U.S. Pat. Nos. 7,399,738 and 7,378,382, the disclosures of which are incorporated herein by reference. Concentrated as well as dilute dispersions of the composition can be formed. Glycols such as propylene glycol, ethylene glycol, or low molecular weight polyols such as glycerine, etc., may be added during the initial dispersion preparation to ensure a stable, readily dispersible concentrate.

Compositions of the present disclosure are formed without the need of any solubilizing aid, dispersing aid, surfactant, or emulsifier or dispersant other than a polymer, as described herein, able to form a aqueous dispersion of the silicone oils in water which exhibits a rheological Critical Strain value greater than zero and less than about 0.5. Processing the compositions of the present disclosure can be achieved using conventional low shear and/or high shear mixing techniques know in the art. Processing of the inventive compositions generally does not require the use of high energy mixing techniques, such as high shear mixing, emulsification, sonication, ultrasonication, heated processing or use of stator/rotor mixers. High shear mixing processes can be employed if desired, but are not required owing to the unique rheological properties of the inventive compositions in order to achieve stable dispersions. The higher shear mixing processes may be employed for purposes of shortening the process time, however, since the additional mixing energy and heat introduced by these energetic processes typically result in faster processing rates, particularly with larger volumes of materials. However, the high shear mixing processes generally require additional energy and more complicated machinery and equipment, both more costly to use and maintain in an industrial or manufacturing environment. In some instances, high shear mixing may have detrimental effects on polymers and other susceptible components of the compositions, particularly optional adjuncts added to provide additional benefits or functionalities to the finished compositions, and may not be desirable as the sole mixing process. Hence, high shear processes can be used.

Alternatively, lower energy and low shear mixing techniques, such as agitation, paddle, blade, vortex and helical screw mixing are generally found sufficient for processing compositions of the present disclosure in order to achieve stable dispersions. The low shear mixing techniques lend themselves to both batch and dynamic mixing, or continuous and static mixing approaches for commercial scale preparation of the inventive compositions. Generally, an agitator is employed for low shear mixing in batch modes, that is processing of compositions in a single tank, typically in larger volume tanks exceeding several hundreds or thousands of gallons in fluid capacity. For low shear mixing in continuous modes, low shear static mixing, employing in-line helical and vortex mixer elements, which produce laminar and turbulent mixing streams, respectively, are generally employed. In continuous mixing modes, the various raw materials are introduced to a continuous fluid stream of the most predominant raw material, typically the water component.

The introduction is generally performed using multiple inlets each dispensing a proportioned amount of material at a rate of introduction adjusted to approximate the desired volume percentage or gravimetric weight percentage of each material in the final composition. The introduction can be via multiple inlets directly into the continuous fluid stream, or via one or more inlets following premix or batch premixing of any two or more compatible components. Thus, suitably compatible components may optionally be combined in smaller premixes or batches prior to introduction into the continuous mixer for ease of handling and processing. The introduction can be simultaneous, that is to say all proportioned materials introduced in the same zone of the continuous mixer, preferably before the shear mixer stage of the continuous mixer, or introduced in separate or multiple zones of the continuous mixer, with or without separate or multiple mixing zones between the inlets. Thus, the inventive compositions may be formed using a continuous process configured in any number of equally suitable configurations of component inlet, mixing and flow stages. Generally, the specific configuration is selected to best match available equipment and the desired properties of the final composition in order to achieve the most efficient continuous process.

Batch mode processing can also be suitably employed to prepare the compositions of the current disclosure. Batch mode processing has some advantages, particularly in that some polymers used in the current disclosure may require a pre-hydration step, sometimes known in the art as "wetting" or "wetting out", prior to further mixing steps, and can generally be performed in the same bulk tank that the remainder of the batch process, i.e., introduction and subsequent mixing of the remaining components of the composition, is conducted in. However, the pre-hydration step may be done in advance of a continuous mixing process, such that the feed stream of the polymer to the continuous mixer system is that of the "wetted" out polymer in aqueous solution.

Typically, the order of processing of the compositions of the present disclosure, for example in a batch mode process, begins with introduction of water into a batch tank sufficient to cover the mixer blades to a depth so that slow agitation may be begun without splashing, cavitation or introduction of air into the stirred liquid. A biocide or preservative is sometimes introduced next in the process to control microorganisms, but this is optional, and may or may not be required depending on the quality of the water and ingredients employed, or can be added at any later step in the process, or after the process is complete. The silicone resin and acrylic-based polymer, either in a powdered, preconcentrated or liquid solution or dispersion form, are generally added next to the stirred batch water. The speed of introduction will depend somewhat on the form of the resin and polymer used (i.e., powder or liquid) and their handling properties and equipment available to the operator. Generally, the speed of introduction is maximized for commercial processes for efficiency, although the formation of concentrated regions, clumps or insufficiently wetted powder during the introduction is undesirable, and the speed of introduction is typically adjusted to avoid these undesirable conditions.

Once the entire charge of the resin and polymer has been introduced, further mixing is continued for a short time, generally 10 to 60 minutes to fully hydrate or "wet out" the resin and polymer material. Adjustments to the batch pH and/or acidity or alkalinity level may optionally be done following this step in the mixing process, in order to at least partially neutralize ionizable anionic polymers, or those anionic polymers known to be alkali swellable, or optionally pH adjustments may be made later in the process, or pH adjusted at any subsequent desired step, or partially adjusted at any subsequent step until the final desired pH of the finished composition, that is the composition with all essential materials and any optional materials added, is achieved. Optionally an acid or alkalizing agent can be employed that may be any suitable material with the capability to either lower or raise the pH of the resin and polymer solution from its native or unadjusted solution pH (typically depending on the polymer and the form in which it is supplied), to the desired solution pH.

Following the "wetting out" step and/or neutralization step, if needed, in the process, the organopolysiloxanes, or silicone oil components are added next, although they may also be added at a later step, for example after the addition of other additives or adjuncts. The speed of introduction of the silicone oil components is generally less subject to problems, but the dispersion process takes some time to fully develop so too fast an addition will generally result in a separating phase, depending on the relative densities of the silicone oils to that of the batch resin and polymer solution, either forming on the top or bottom of the batch tank and reducing the dispersion efficiency. Thus, in general, introduction of the silicone components is adjusted so that the introduction speed is approximately equivalent to the speed of formation of the dispersion to prevent excessive separation in the mixing tank. As the silicone oil components are generally more hydrophobic than the aqueous phase, less water soluble or water insoluble components of the composition, such optional adjuncts as described herein, may optionally be premixed with the silicone oil components prior to the dispersion process step. This approach generally provides for more uniform and stable inclusions of the less water soluble or water insoluble components desired to be present, rather than introducing them separately and/or at a later step in the process following the silicone oils dispersion process step, although these may also alternatively be added at an earlier step or a later step following the silicone oils addition.

The silicone oils addition step may also alternatively be conducted in a continuous process operation as described herein. Following the silicone oils addition step, whether conducted in a batch or continuous process, a stable dispersion is created that will retain the silicone oils without significant separation suitable for immediate use and/or use following extended storage times. In general, the mixing process employed, including but not limited to those described herein for producing the compositions of the present disclosure, is sufficient to provide silicone oil dispersions wherein the dispersed silicone oils phase has an average particle size distribution around and/or below 500 microns. Silicone dispersions of the present disclosure having average particle size distributions around and/or below about 500 microns are found to have suitable stability and performance attributes during storage and use. Particle size can be measured during the mixing process to ensure that the particle size of the dispersed silicone oils phase is within the desired range, or measured after processing. Additional mixing, extended mixing time, and/or mixing with increased shearing or increased temperature may suitably be employed to further reduce the average particle size distribution of the inventive compositions to around and/or below about 500 microns.

Further reduction of the particle size can optionally be performed by mixing techniques as described herein at any subsequent stage of the process, such as for example, after other additives and adjuncts have been added, or for example, during their addition. Alternatively, selected mixing techniques, such as for example, low shear and low energy mixing processes, can be employed at any subsequent stage of the process to introduce other additives and adjuncts to the compositions of the present disclosure without substantially changing the effective average particle size distribution of the dispersed silicone oils phase. Thus, a variety of mixing and processing techniques may be employed to achieve the desired average particle size distribution of the dispersed silicone oils phase in the inventive compositions, and these mixing and processing techniques may be employed in any order following the first preparation of the dispersions.

Once the silicone oil dispersions are formed, subsequent processing can be employed, including introduction of the hydrocarbon solvent. Optional adjuncts may also be introduced, such as for example, but not limited to, surfactants, surface wetting agents, spreading agents, stabilizers, ultraviolet absorbers, ultraviolet light scatterers, ultraviolet blockers, pigments, dyes, coloring agents, preservatives, microbiocides, fungicides, plasticizers, alkalinity agents, buffers, pH adjusting acids, bases and their conjugate salts, fragrances, polishes, abrasives, wax, lubricants, thickening agents, nanoparticulate materials and mixtures thereof. Alternatively, the optional adjuncts may be added to the composition prior to the silicone oils addition, or alternatively at any later step in the process. In continuous process, the optional adjuncts may be introduced simultaneously with the silicone oils, or alternatively proceed addition of the silicone oils, or yet alternatively be added after the silicone oils.

The compositions are sufficiently robust to allow additional further processing and handling typical to a manufacturing or commercial process, such as pumping, fluid transfer, tank charging, batching, dispensing and filling operations generally employed to make, transfer, store and package compositions for distribution and use.

It is to be understood that other mixing processes, and the order in which the mixing steps are conducted, can be varied to some extent, and other processes known in the art employed to prepare the compositions of the present disclosure Method of Using and Application This disclosure is also directed to a method of using the compositions to wax non-porous surfaces, particularly automotive exterior surfaces (e.g., automotive paint surfaces). The method involves: (1) applying the composition to an automotive exterior surface; and (2) distributing the composition onto the automotive surface with an application implement, thereby leaving a protective wax film on the surface. The protective wax film also effectively repels dirt and enables easier cleaning for next time washes.

The composition of this disclosure can be used to wax not only automotive exterior surfaces but any non-porous surface, including, but not limited to, metals, plastics, Plexiglass, fiberglass, glass, enamel, tiles, and the like.

In one embodiment of the method of this disclosure, the composition is applied by spraying onto the surface. Spraying can be accomplished using, e.g., a hand pump or aerosol.

Although spraying the composition onto the surface is the preferred method of application, the composition of this disclosure may be applied to the target surface by a variety of means, including via a wash, dip or immersion process. The composition may be applied by means of a carrier, including but not limited to, an impregnated wipe, woven substrate, non-woven substrate, pad, foam, sponge, cloth, towel, towelette, tissue or paper towel or similar releasably absorbent carrier and/or combination that enables the inventive composition to be applied by direct physical contact and transferred from the carrier to the target surface, generally during a spreading, padding, rubbing or wiping operation. Combinations of a direct application, like spraying, followed by a spreading, padding, rubbing or wiping operation performed with the aid of a foam, sponge, cloth, towel, tissue or paper towel, squeegee or similar wiping implement is also suitable for applying the composition of the present disclosure.

In one embodiment, the composition of the present disclosure is sprayed directly onto the target surface and therefore are typically packaged in a spray dispenser. The spray dispenser can be any of the manually activated means for producing a spray of liquid droplets as is known in the art, e.g. trigger-type, pump-type, electrical spray, hydraulic nozzle, sonic nebulizer, high pressure fog nozzle, non-aerosol self-pressurized, and aerosol-type spray means. Automatic activated means can also be used herein. These type of automatic means are similar to manually activated means with the exception that the propellant is replaced by a compressor.

The spray dispenser can be an aerosol dispenser. The aerosol dispenser comprises a container which can be constructed of any of the conventional materials employed in fabricating aerosol containers. The dispenser must be capable of withstanding internal pressure in the range of from about 5 to about 120 psig (pounds per square inch gas), more preferably from about 10 to about 100 psig. An important requirement concerning the dispenser is that it be provided with a valve member which will permit the inventive composition contained in the dispenser to be dispensed in the form of a spray of fine, or finely divided, particles or droplets. The aerosol dispenser utilizes a pressurized sealed container from which the inventive composition is dispensed through a special actuator/valve assembly under pressure. The aerosol dispenser is pressurized by incorporating therein a gaseous component generally known as a propellant. A more complete description of commercially available aerosol-spray dispensers appears, for example, in U.S. Pat. Nos. 3,436,772 and 3,600,325, the disclosures of which are incorporated herein by reference.

Alternatively the spray dispenser can be a self-pressurized non-aerosol container having a convoluted liner and an elastomeric sleeve. The self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of the inventive composition and of causing the product to be dispensed. A more complete description of self-pressurized spray dispensers can be found, for example, in U.S. Pat. Nos. 5,111,971 and 5,232,126, the disclosures of which are incorporated herein by reference.

Another type of aerosol spray dispenser is one wherein a barrier separates the inventive composition from the propellant (preferably compressed air or nitrogen), as is disclosed in U.S. Pat. No. 4,260,110, the disclosure of which is incorporated herein by reference. Such a dispenser is available from EP Spray Systems, East Hanover, N.J.

In one embodiment, the spray dispenser is a non-aerosol, manually activated, pump-spray dispenser. The pump-spray dispenser comprises a container and a pump mechanism which securely screws or snaps onto the container. The container comprises a vessel for containing the inventive composition to be dispensed. The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears, for example, in U.S. Pat. Nos. 4,895,279, 4,735,347, and 4,274,560, the disclosures of which are incorporated herein by reference.

Most preferably, the spray dispenser is a manually activated trigger-spray dispenser. The trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethylene-terephthalate; polyvinyl chloride; polystyrene; blends of polyethylene, vinyl acetate, and rubber elastomer. Other materials can include stainless steel and glass. The trigger-spray dispenser does not incorporate a propellant gas.

In one embodiment using a trigger-spray dispenser, the composition is free or essentially free of volatile organic solvents. The trigger-spray dispenser herein is typically one which acts upon a discrete amount of the inventive composition itself, typically by means of a piston or a collapsing bellows that displaces the composition through a nozzle to create a spray of thin liquid. The trigger-spray dispenser typically comprises a pump chamber having either a piston or bellows which is movable through a limited stroke response to the trigger for varying the volume of said pump chamber. This pump chamber or bellows chamber collects and holds the product for dispensing. The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either trigger spray dispenser acts to open the top outlet check valve. The top valve allows the product to be forced through the swirl chamber and out the nozzle to form a discharge pattern. An adjustable nozzle cap can be used to vary the pattern of the fluid dispensed. For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. Nos. 4,082,223, 4,161,288, 4,434,917, 4,819,835, 5,303,867, the disclosures of which are incorporated herein by reference. A broad array of trigger sprayers or finger pump sprayers are suitable for use with the compositions of this disclosure. These are readily available from suppliers such as Calmar, Inc., City of Industry, Calif.; CSI (Continental Sprayers, Inc.), St. Peters, Mo.; Berry Plastics Corp., Evansville, Ind.; or Seaquest Dispensing, Cary, Ill.

In a preferred method for application of the composition of this disclosure, a vehicle is washed thoroughly and dried before use of the composition. A bottle containing the composition should be shaken well for best results. A squeeze cap size amount of the composition is then applied onto surface of the vehicle, a terry cloth towel or a suitable applicator. The composition is spread in a thin, even coat over 2-3 square foot section of the vehicle. A dry microfiber cloth should be used to immediately wipe away composition lightly. There is no need to frequently turn over microfiber cloth during removal process. The composition is applied section by section until vehicle is complete.

Regular washing of the vehicle throughout the year will rejuvenate the wax performance. Virtually no wiping of the vehicle with towels is needed to dry surface after washing. When rinsing the vehicle after wash, free flowing water from hose can be used starting at the roof. The water should flow freely off the surface of the vehicle, leaving virtually a dry surface. A towel can be used to gently soak up any water beads left behind after rinse. There should be minimal wiping of surface so as to extend durability of wax coating.

A highly desirable wax performance property of this disclosure is that after the initial application of the composition, only a single rinse is needed for cleaning the vehicle. The next time wash after initial application is thus made very simple.

Rheological Parameters

Without being bound by theory, it is believed that the systems of the present disclosure contain a sufficient concentration of dispersed particles or dispersed particle-like components to form a composition-spanning three-dimensional network at rest. Such a particle network can be formed by various types of structural building blocks, including, but not limited to, hydrated polymer molecules. Hydrated polymer molecules are commonly exhibited from a variety of partially water soluble or water or alkaline hydratable polymers, including, but not limited to, water-swellable and alkali-swellable polymers and copolymers described herein.

A further property of these composition-spanning particle networks in the systems of the present disclosure is that they store energy elastically, that is to say reversibly, at small deformations, but break down and become flowable when the applied deformation exceeds a critical value. This is typical of moderately concentrated emulsions and dispersions, such as creamy salad dressing and ketchup. This is in contrast to thick, but Newtonian fluids, such as honey, which have no elastic response and flow under all conditions, however slowly this flow may be. This is also in contrast to elastic fluids, which are viscous and flow like a liquid under slow deformation, but are also elastic and behave like a springy solid under fast deformation, such as Silly Putty™.

The rheological behavior of the inventive systems can be identified and characterized by their viscoelastic response to an applied sinusoidal oscillation of either strain (displacement) or stress (force) at constant frequency. In a strain sweep, applied strain is varied and stress is measured, whereas in a stress sweep, applied stress is varied and strain is measured. The choice of experiment depends on the preference of the experimenter or on the type of rheometer available, but results are essentially equivalent between the two modes of measurement. In other words, if the output variables from a stress sweep are plotted as a function of strain, the resultant measured data curves should be comparable to those obtained from a strain sweep. Output variables include the magnitude of the complex modulus $G^*$ (the maximum stress amplitude divided by the maximum strain amplitude), the phase angle $\delta$ (the phase shift between strain and stress waves), the Elastic Modulus $G'$ and viscous modulus $G''$ (the in-phase and out-of phase components of $G^*$, or $|G^*|\cos \delta$ and $|G^*|\sin \delta$, respectively).

Critical Strain and Elastic Modulus Parameters

For systems of the present disclosure, which are stabilized by a particle network, the rheological variables are constant at small strains, but start to change when the strain exceeds a certain value called the Critical Strain value, or $\gamma_o$; in particular, the Elastic Modulus value $G'$ decreases and the phase angle $\delta$ increases above the Critical Stain value $\gamma_o$. At strains below the Critical Strain value $\gamma_o$ (defined as the linear viscoelastic region of the system), the network exhibits a consistent degree of elasticity, and stretches but does not break down. At strains above the Critical Strain value $\gamma_o$, the decrease in $G'$ and increase in $\delta$ signify breakdown of the particle network and initiation of dispersive flow. A further property of these network-stabilized systems is that the strain behavior just described is relatively invariant to the frequency of the oscillation. This is in contrast to elastic fluids, which may show strain behavior resembling that described above at high frequencies, while showing Newtonian behavior, where the rheological parameters reflect only viscous flow at all strains and $\gamma_o$ is undefined at low frequencies.

For systems of the present disclosure, the consistent elastic response at low strains relates to an ability to keep dispersed silicone oil droplets apart and in suspension, whereas a decrease in the elastic response with increasing energy input allows for the material to flow and release the silicone oil droplets. Note that the existence of a Critical Strain value implicates the existence of a linear viscoelastic region, and furthermore, that the value of $G'$ in the linear viscoelastic region must be greater than zero, since this parameter decreases outside of the linear viscoelastic region. The existence of a Critical Strain value that does not vanish (i.e., exhibit zero or negative value) at low frequency is therefore definitive of dispersion with an at-rest structure that can trap and stabilize the silicone oil droplets.

A convenient way to rheologically characterize these network-stabilized systems of the current disclosure is by the Critical Strain value $\gamma_o$ and by the Elastic Modulus value $G'$ in the linear viscoelastic region. For the systems of the disclosure, the Critical Strain value ranges from greater than zero to about 0.5 (dimensionless units), and the Elastic Modulus value in the linear viscoelastic region ranges from greater than zero to about 400 Pascals.

The Critical Strain value thus represents the degree to which the sample must be deformed in order to initiate structural breakdown. Without being bound by theory, it is believed to be reasonable to assume that the process of wiping the inventive dispersions onto a surface or wiping after application, results in a certain degree of localized strain at the surface, although the non-uniformity of both the compositions and the surfaces in question precludes making simple extrapolations to the bulk properties measured in the rheometer. Inventive dispersions with a Critical Strain value greater than zero and less than about 0.5 require only a minimal deformation force to rupture the dispersion and thereby allowing the silicone oil to become available for initial contact and subsequent wetting of and eventual partitioning and/or coating onto the target substrate, thereby resulting in the desired treatment characteristics of preserving, protecting, coating, and restoring appearance and shine to the treated substrate surfaces. Dispersions with a Critical Strain value greater than about 0.5 require an excessive deformation force, not typically achieved by manual forces associated with wiping actions, and are therefore less likely to allow the silicone oil droplets to make the initial contact with the surface that is necessary for silicone wetting to occur. The value of $G'$ in the linear viscoelastic region gives an indication of the ability of the network to resist structural rearrangement.

Various modifications and variations of this disclosure will be obvious to a worker skilled in the art and it is to be understood that such modifications and variations are to be included within the purview of this application and the spirit and scope of the claims.

EXAMPLES

Preparation of Composition of this Disclosure

In accordance with procedures described herein, a composition was prepared having the following formulation (total 100 weight percent): 7.6 weight percent Belsil TMS 803 (Wacker); 3.9 weight percent DC-200 fluid (5 cst) (Dow Corning); 1.0 weight percent DC-200 fluid (12,500 cst) (Dow Corning); 1.2 weight percent Novemer™ EC-1 (Lubrizol); 11.5 weight percent LPA-210 (Sasol); 0.1 weight percent Dantoguard Plus Liquid (Lonza); 0.2 weight percent Fragrance 373696 (Symrise); and 74.5 weight percent deionized water.

Method for Soil Repellency Test

This method involved determining soil repellency for a coating made from a composition of this disclosure having the formulation described above (Inventive Panel), a Meguiars NXT generation tech wax 2.0 (Comparative Panel A), and a Nu Finish once a year car polish (Comparative Panel B). Control panels having no treatment (Ford F-150 reference panels) were prepared as well as non-control panels treated with one of the products above. The control panels were measured for filming and streaking using a filming and streaking machine. A mixture of hardwater and Sharpsburg soil (90/10 ratio) was applied to the non-control panels from a trigger bottle. Three sprays were used for each product above. The panels were then baked in an oven at a temperature of 100° C. for a period of 20 minutes. The panels with dirt application were measured for filming and streaking using a filming and streaking machine. The panels were then rinsed under a faucet for 10 rinses moving up and down the panel. The panels were air dried with an air hose. After the rinsing, the panels were all measured for filming and streaking using a filming and streaking machine. Data from the filming and streaking machine is set forth in the Tables A and B below. Table A shows filming and streaking machine measurement data after soil application for the indicated panels, i.e., dirt on the panels. Table B shows filming and streaking machine measurement data after rinsing and air drying.

TABLE A

| Control Panel | Inventive Panel | Comparative Panel A | Comparative Panel B |
|---|---|---|---|
| 4 | 7.4 | 16.4 | 22.4 |
| 4.1 | 7.5 | 12.7 | 23.7 |
| 4.1 | 8.1 | 12.5 | 22.6 |

TABLE B

| Control Panel | Inventive Panel | Comparative Panel A | Comparative Panel B |
|---|---|---|---|
| | 4.4 | 10.3 | 21 |
| | 4.5 | 8.2 | 23.4 |
| | 4.2 | 7.5 | 20.7 |

The data from Tables A and B show that the filming and streaking machine measurement values increase after soil is applied onto the panels. However, after rinsing and air drying, in contrast to the comparative panels, the filming and streaking machine measurement values of the inventive panels decrease to near the values of the control panel.

Wax Durability Test

A car wash concentrate available from Armored Auto-Group, Danbury, Conn., was diluted in a container (15.62 grams of concentrate to 2000 grams tap water) to foam a soap solution. A soft grip wash sponge (Armaly Brands) was dipped into the container. The soap solution was absorbed into sponge, and the sponge was squeezed three times. A prepared test panel was placed onto Gardco washability-wear-friction-tester machine model D10VF. The machine was set at a speed of 5 and 3 cycles. The sponge was cut and placed to fit in between tester arms, and a weight equal to 1100 grams was put on top of sponge. The wash procedure was then started with three back and forth motion equals one wash. For each panel, 6 full rinses under tap water were completed. An air hose was used for water removal. The contact angle was determined by the Kruss Contact Angle Measuring System G-10 in which 6 measurements were taken per panel and the data was recorded. The contact angle was determined at 1 wash, and at 5, 10, 15, and 20 washes. Wash in between contact angle cycles was continuous, without stopping to soak the sponge. Wax application onto panel was at 1.0 grams per 6×6 panel. Three back and forth motions (3 cycles) on the scrubber equaled 1 wash.

Figure 1:
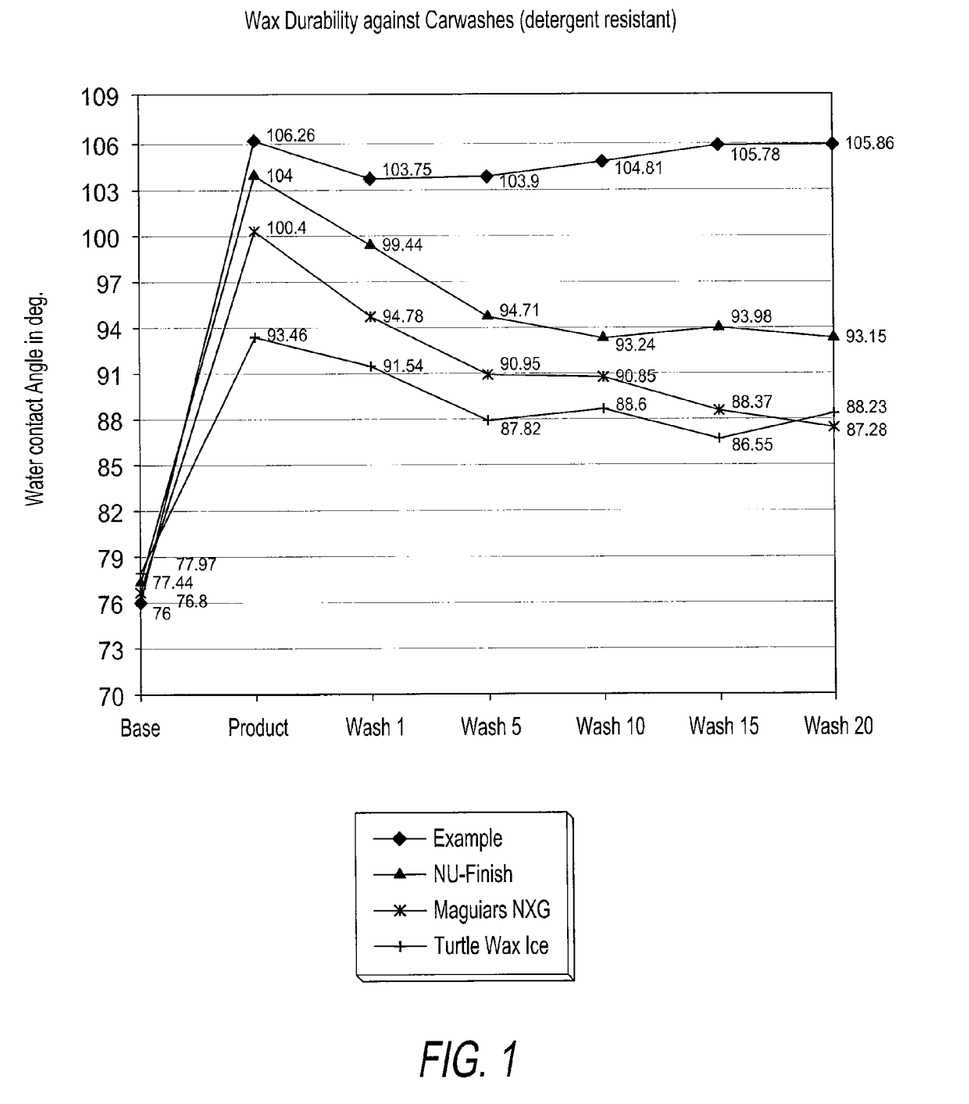
FIG. 1 graphically depicts wax durability against the number of car washes (detergent resistance). The wax durability is shown by contact angle.

FIG. 1 shows the long lasting properties, e.g., hydrophobicity as shown by high contact angle, of the compositions of this disclosure after many washes. As shown in FIG. 1, the wax durability against car washes (detergent resistance) extends for many washes.

Contact Angle Measurement

The contact angles were measured using the Kruss Contact Angle Measuring System G-10 (DSA v 1.80). The results were theta M measurements.

Wax Durability Test

Modified (Dirt Application)

Each treated panel was sprayed with a mixture of 98% tap water and 2% dirt (Sharpsburg soil). Each treated panel was sprayed 3 times and dried in an oven at a temperature of 100° C. for a period of 20 minutes. The contact angle was determined by the Kruss Contact Angle Measuring System G-10 in which 6 measurements were taken per panel and the data was recorded. The contact angle was determined at 1 wash, and at 5, 10, 15, and 20 washes. Wash was conducted as above using the Gardco washability-wear-friction-tester machine model D10VF. Wax application onto panel was at 1.0 grams per 6×6 panel. Three back and forth motions (3 cycles) on the scrubber equaled 1 wash.

Figure 2:
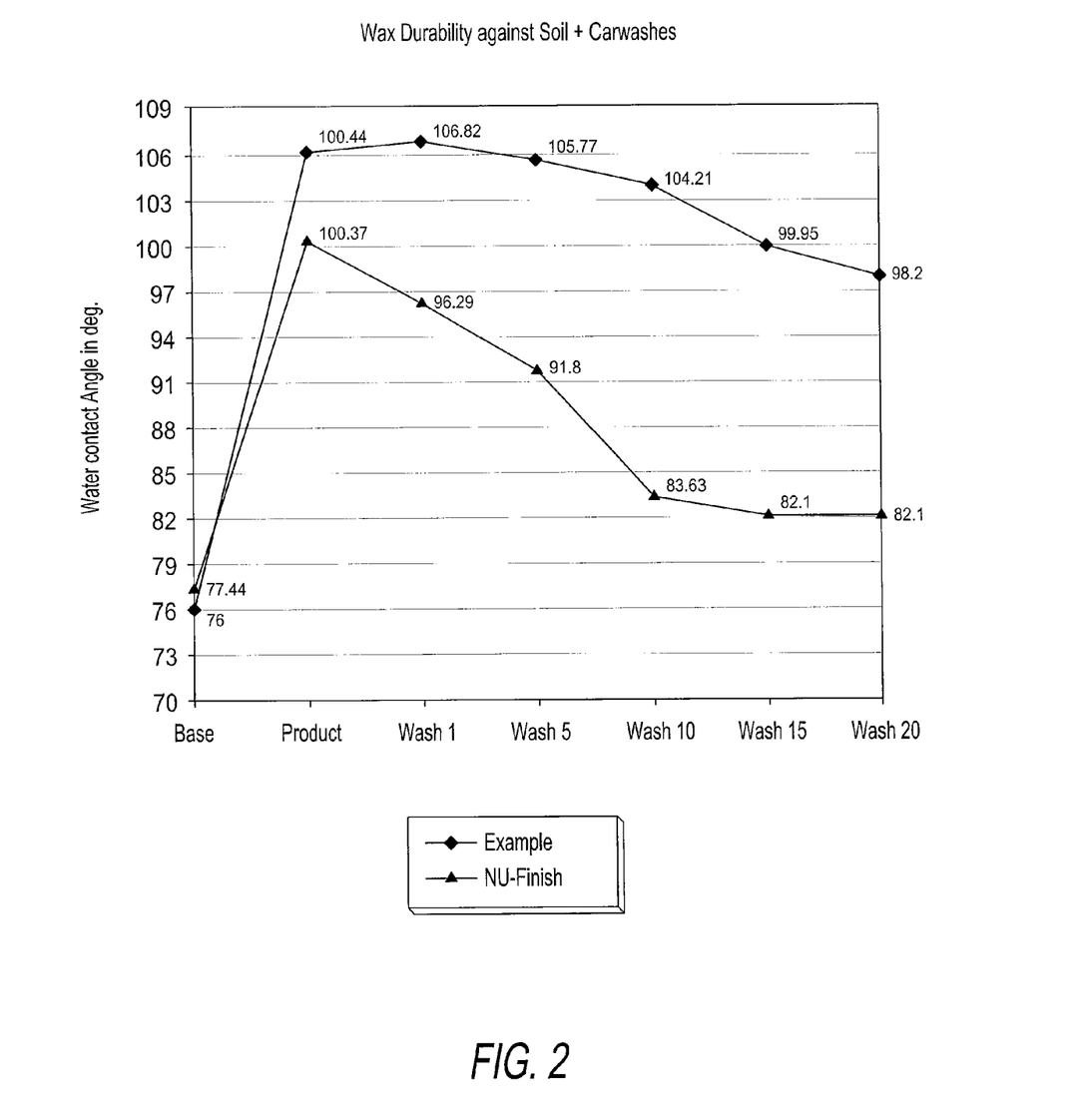
FIG. 2 graphically depicts wax durability against soil and the number of car washes (soil and detergent resistance). The wax durability is shown by contact angle.

FIG. 2 shows the long lasting properties, e.g., hydrophobicity as shown by high contact angle, of the compositions of this disclosure after many washes. As shown in FIG. 2, the wax durability against soil and car washes (soil and detergent resistance) extends for many washes.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A composition consisting of:
    a) a silicone resin comprising a MQ resin, wherein the MQ resin has a M:Q ratio from about 0.5:1.0 to about 1.5:1.0 and the average molecular weight from about 1000 to about 10,000;
    b) a first silicone fluid having a viscosity from about 1 to about 15,000 centistokes at 25° C.;
    c) a second silicone fluid having a viscosity from about 1 to about 30,000 centistokes at 25° C.;
    d) an acrylic polymer;
    e) a hydrocarbon solvent;
    f) water; and g) optionally one or more adjuncts selected from the group consisting of leveling agents, pH adjusters, buffers, spreading agents, brighteners, fluorescent whitening agents, ultraviolet (UV) absorbers, UV scatterers, infrared (IR) absorbers, IR scatterers, free-radical quenchers, free-radical stabilizers, excited state quenchers (ESQ), anti-oxidants, preservatives, fragrant oils, propellants, and their mixtures.

2. The composition of claim 1 which exhibits a water contact angle of above 100° when directly coated on an automotive surface.

3. The composition of claim 1 wherein the silicone resin comprises trimethylsiloxysilicate.

4. The composition of claim 1 wherein the first silicone fluid and the second silicone fluid are the same or different and are selected from the group of silicone oils having the formula:

wherein n is between 0 and 3, m is 2 or greater, and R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof.

5. The composition of claim 1 wherein the first silicone fluid and the second silicone fluid are the same or different and comprise a polydiorganosiloxane fluid.

6. The composition of claim 1 wherein the first silicone fluid and the second silicone fluid are the same or different and are selected from the group consisting of polydimethylsiloxane, polydiethylsiloxane, polymethylphenylsiloxane, polyalkylarylsiloxane, polyethyleneoxydialkylsiloxane, polypropyleneoxydialkylsiloxane, polydialkylcyclosiloxane, and mixtures thereof.

7. The composition of claim 1 wherein the first silicone fluid and the second silicone fluid are the same or different and are selected from the group consisting of polymethylphenylsiloxanes, polyRdimethylsiloxane)/methylvinyl-siloxane)], poly[(dimethylsiloxane)/(diphenylsiloxane)], poly[(dimethylsiloxane)/(phenylmethylsiloxane)], poly[(dimethylsiloxane)/(diphenylsiloxane)/(methylvinylsiloxane)], and mixtures thereof.

8. The composition of claim 1 wherein the first silicone fluid a viscosity from about 1 to about 7,500 centistokes at 25° C., and the second silicone fluid a viscosity from about 1 to about 20,000 centistokes at 25° C.

9. The composition of claim 1 wherein the acrylic polymer is selected from the group consisting of polyacrylate polymers and copolymers containing at least one acrylate monomer, alkali swellable polyacrylate polymers and copolymers containing at least one acrylate monomer, non-linear polyacrylate polymers cross-linked with at least one polyalkenyl polyether monomer, hydrophobically modified cross-linked polyacrylate polymers and copolymers containing at least one hydrophobic monomer, and mixtures thereof.

10. The composition of claim 1 wherein the acrylic polymer comprises an alkali-swellable acrylic polymer or copolymer cross-linked with at least one polyalkenyl polyether monomer.

11. The composition of claim 1 which exhibits a rheological Critical Strain value greater than zero and less than about 0.5 and an Elastic Modulus value greater than zero and less than about 400 Pascals.

12. The composition of claim 1 wherein the hydrocarbon solvent comprises a paraffinic naphthenic solvent.

13. The composition of claim 1 wherein the water comprises deionized water.

14. The composition of claim 1 wherein the silicone resin is present in an amount from about 0.1 weight percent to about 15.0 weight percent of the composition, the first silicone fluid is present in an amount from about 0.01 weight percent to about 12 weight percent of the composition, the second silicone fluid is present in an amount from about 0.01 weight percent to about 12 weight percent of the composition, the acrylic polymer is present in an amount from about 0.001 weight percent to about 5 weight percent of the composition, the hydrocarbon solvent is present in an amount from about 0.001 weight percent to about 25 weight percent of the composition, and the water is present in an amount from about 65 weight percent to about 98 weight percent of the composition.

15. The composition of claim 1 wherein the adjuncts are present in an amount from about 0.0001 weight percent to about 20 weight percent of the composition.

16. A composition consisting of:
a) a silicone resin comprising a MQ resin, wherein the MQ resin has a M:Q ratio from about 0.5:1.0 to about 1.5:1.0 and the average molecular weight from about 1000 to about 10,000;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) water; and
f) optionally one or more adjuncts selected from the group consisting of leveling agents, pH adjusters, buffers, spreading agents, brighteners, fluorescent whitening agents, ultraviolet (UV) absorbers, UV scatterers, infrared (IR) absorbers, IR scatterers, free-radical quenchers, free-radical stabilizers, excited state quenchers (ESQ), anti-oxidants, preservatives, fragrant oils, propellants, and their mixtures.

17. A method of treating an automotive surface, said method comprising:
a) applying an effective amount of an aqueous composition to said automotive surface; and
b) distributing said aqueous composition onto said automotive surface with an application implement;
wherein said aqueous composition consists of:
a) a silicone resin comprising a MQ resin, wherein the MQ resin has a M:Q ratio from about 0.5:1.0 to about 1.5:1.0 and the average molecular weight from about 1000 to about 10,000;
b) a first silicone fluid having a viscosity from about 1 to about 15,000 centistokes at 25° C.;
c) a second silicone fluid having a viscosity from about 1 to about 30,000 centistokes at 25° C.;
d) an acrylic polymer;
e) a hydrocarbon solvent;
f) water;
g) a propellant; and
h) optionally one or more adjuncts selected from the group consisting of leveling agents, pH adjusters, buffers, spreading agents, brighteners, fluorescent whitening agents, ultraviolet (UV) absorbers, UV scatterers, infrared (IR) absorbers, IR scatterers, free-radical quenchers, free-radical stabilizers, excited state quenchers (ESQ), anti-oxidants, preservatives, fragrant oils, propellants, and their mixtures.

18. The method of claim 17 wherein said application implement does not come into direct contact with said automotive surface, and wherein said application implement is selected from the group consisting of a spray device and an aerosol device.

19. The method of claim 17 wherein said application implement comes into direct contact with said automotive surface, and wherein said application implement is selected from the group consisting of a wipe, woven substrate, nonwoven substrate, sponge, towelette, pad and/or combination.

20. The method of claim 17 further comprising the step c) of removing excess aqueous composition from the automotive surface following step a) or step b).

21. The method of claim 20 wherein step c) of removing excess aqueous composition from the automotive surface following step a) or step b) comprises the use of said application implement or an aqueous rinse comprising water.

22. The method of claim 20 further comprising step d) of rinsing said automotive surface with an aqueous rinse comprising water.

23. An automotive surface coated with a composition, said composition consisting of:
   a) a silicone resin comprising a MQ resin, wherein the MQ resin has a M:Q ratio from about 0.5:1.0 to about 1.5:1.0 and the average molecular weight from about 1000 to about 10,000;
   b) a first silicone fluid having a viscosity from about 1 to about 15,000 centistokes at 25° C.;
   c) a second silicone fluid having a viscosity from about1 to about 30,000 centistokes at 25° C.;
   d) an acrylic polymer;
   e) a hydrocarbon solvent;
   f) water; and
   g) optionally one or more adjuncts selected from the group consisting of leveling agents, pH adjusters, buffers, spreading agents, brighteners, fluorescent whitening agents, ultraviolet (UV) absorbers, UV scatterers, infrared (IR) absorbers, IR scatterers, free-radical quenchers, free-radical stabilizers, excited state quenchers (ESQ), anti-oxidants, preservatives, fragrant oils, propellants, and their mixtures.

* * * * *